United States Patent
Hicks et al.

(10) Patent No.: US 11,652,975 B2
(45) Date of Patent: *May 16, 2023

(54) FIELD CALIBRATION OF STEREO CAMERAS WITH A PROJECTOR

(71) Applicant: Sony Group Corporation, Tokyo (JP)

(72) Inventors: Richmond Hicks, Beaverton, OR (US); Sundeep Raniwala, Mountain View, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,674

(22) Filed: Mar. 19, 2021

(65) Prior Publication Data
US 2021/0211634 A1 Jul. 8, 2021

Related U.S. Application Data

(63) Continuation of application No. 15/443,709, filed on Feb. 27, 2017, now Pat. No. 11,025,887.

(51) Int. Cl.
*H04N 13/239* (2018.01)
*H04N 17/00* (2006.01)
(Continued)

(52) U.S. Cl.
CPC ....... *H04N 13/239* (2018.05); *G01B 11/2504* (2013.01); *G01B 11/2545* (2013.01); *G01B 11/272* (2013.01); *G06T 7/521* (2017.01); *G06T 7/593* (2017.01); *G06T 7/85* (2017.01); *H04N 17/002* (2013.01); *G06T 2207/10012* (2013.01); *G06T 2207/10024* (2013.01); *G06T 2207/10048* (2013.01); *H04N 13/128* (2018.05); *H04N 13/246* (2018.05); *H04N 13/271* (2018.05); *H04N 2013/0081* (2013.01)

(58) Field of Classification Search
CPC ............ G01B 11/2504; G01B 11/2545; G01B 11/272; G06T 2207/10012; G06T 2207/10024; G06T 2207/10048; G06T 7/521; G06T 7/593; G06T 7/85; H04N 13/128; H04N 13/239; H04N 13/246; H04N 13/271; H04N 17/002; H04N 2013/0081
See application file for complete search history.

(56) References Cited

U.S. PATENT DOCUMENTS 9,866,820 B1  1/2018 Agrawal et al.
11,025,887 B2 * 6/2021 Hicks ...................... G06T 7/593
(Continued)

*Primary Examiner* — Farzana Hossain
(74) *Attorney, Agent, or Firm* — Michael Best & Friedrich LLP

(57) ABSTRACT

Calibration in the field is described for stereo and other depth camera configurations using a projector One example includes imaging the first and the second feature in a first camera of the camera system wherein the distance from the first camera to the projector is known, imaging the first and the second feature in a second camera of the camera system, wherein the distance from the second camera to the projector is known, determining a first disparity between the first camera and the second camera to the first feature, determining a second disparity between the first camera and the second camera to the second feature, and determining an epipolar alignment error of the first camera using the first and the second disparities.

21 Claims, 8 Drawing Sheets

(51) Int. Cl.
*G01B 11/25* (2006.01)
*G01B 11/27* (2006.01)
*G06T 7/80* (2017.01)
*G06T 7/521* (2017.01)
*G06T 7/593* (2017.01)
*H04N 13/00* (2018.01)
*H04N 13/128* (2018.01)
*H04N 13/271* (2018.01)
*H04N 13/246* (2018.01)

(56) References Cited

U.S. PATENT DOCUMENTS

| | | |
|---|---|---|
| 2010/0020178 A1 | 1/2010 | Kleihorst |
| 2010/0074532 A1 | 3/2010 | Gordon et al. |
| 2010/0215248 A1 | 8/2010 | Francini et al. |
| 2014/0300704 A1 | 10/2014 | Ramaswamy et al. |
| 2016/0191759 A1 | 6/2016 | Somanath et al. |
| 2017/0070731 A1 | 3/2017 | Darling et al. |
| 2017/0180706 A1 | 6/2017 | Salvagnini et al. |
| 2017/0270669 A1* | 9/2017 | Nezamabadi ......... G02F 1/1334 |

* cited by examiner

FIELD CALIBRATION OF STEREO CAMERAS WITH A PROJECTOR

CROSS-REFERENCE TO RELATED APPLICATION

This application is a continuation of U.S. application Ser. No. 15/443,709, filed Feb. 27, 2017, which is herein incorporated by reference in its entirety.

FIELD

The present description relates to the field of calibrating a depth imaging system and, in particular, to determining alignment errors using a projector.

BACKGROUND

Active stereo cameras determine depth by triangulating features that are recognized in both the left and right cameras. Once a common feature is identified, its depth can be determined. The accuracy of this determination depends on knowing the optical characteristics of the cameras and their pointing directions. This technology works well in brightly illuminated scenes and where there are adequate, naturally occurring features in the scene on which the system can base the depth calculation.

To cover usages where there are insufficient naturally occurring features or illumination, some types of active stereo cameras include an IR Projector that casts a pseudo-random pattern onto a scene. This light pattern is used as features and augments any naturally occurring scene attributes. In some such cameras, in contrast with structured light cameras, the triangulation for depth determination is between the two cameras and not between the projector and the camera.

Depth camera systems that rely on triangulation, including active stereo cameras, are calibrated and performance tested at the time of manufacturing. Performance tests employ special reference targets that are compared against a reference model to determine if the camera is operating correctly and to set calibration parameters. Because the distance to the target and the shape of the target are known, the system is able to determine misalignment and other non-ideal characteristics of the cameras and modify the depth calculation parameters to accommodate these errors, thereby improving the accuracy of the depth camera.

BRIEF DESCRIPTION OF THE DRAWING FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity.

DETAILED DESCRIPTION

As described herein an active stereo camera with a pattern projector may be calibrated using a pattern from the pattern projector. The pattern projector of the active stereo camera directs a structured light source to a surface. Two imagers each capture one or more images of the structured light on the surface. The disparity of the images of the light as viewed by each imager provides an independent measure of depth that can be used to extract alignment errors in the imagers independent of the scene contents. By using the projector to provide a structure that does not rely on the scene in front of the cameras, the cameras may be recalibrated by the consumer in the field. With system assistance, the recalibration may be simple and quick.

The described approach may be used in addition to, or instead of, factory calibration. Factory calibration can be very accurate but depends upon a priori knowledge of and access to the factory target. This can be used to provide an original default value before a product is shipped. Due to thermal and mechanical stress, the physical alignment of the camera components can drift over time, reducing the accuracy of the original factory calibration of the depth camera. By performing additional periodic calibrations in the field with the consumer, these variations may also be compensated for.

Many depth cameras include an infrared pattern projector. Visible light pattern projectors are also used. The pattern projector may be used for any of a variety of different purposes, depending on the particular system. For tablets, smart phones, computers, displays, webcams, and similar types of devices, the projector may be used for IR depth measurements, for iris or face scanning, for low light illumination and for other purposes. The projector includes a source of light, such as an LED, VCSEL, laser or other lamp, and a reticle, mask, lens or other pattern source to structure the light emitted from the lamp. The structured pattern of light is projected onto any surface in front of the projector so that its reflection may be viewed by the imagers. The projector is particularly helpful in determining the distance to objects that do not have sharp features. In many cases, the projector is an IR projector and the images capture the IR light, but other systems use visible light.

The structured light can be generated by a variety of different projector light sources including a projector using a DOE (Diffractive Optical Element), diffuser, or a VCSEL (Vertical Cavity Surface-Emitting Laser). The pattern may be fixed or it may be a sequence of multiple patterns.

Figure 1:
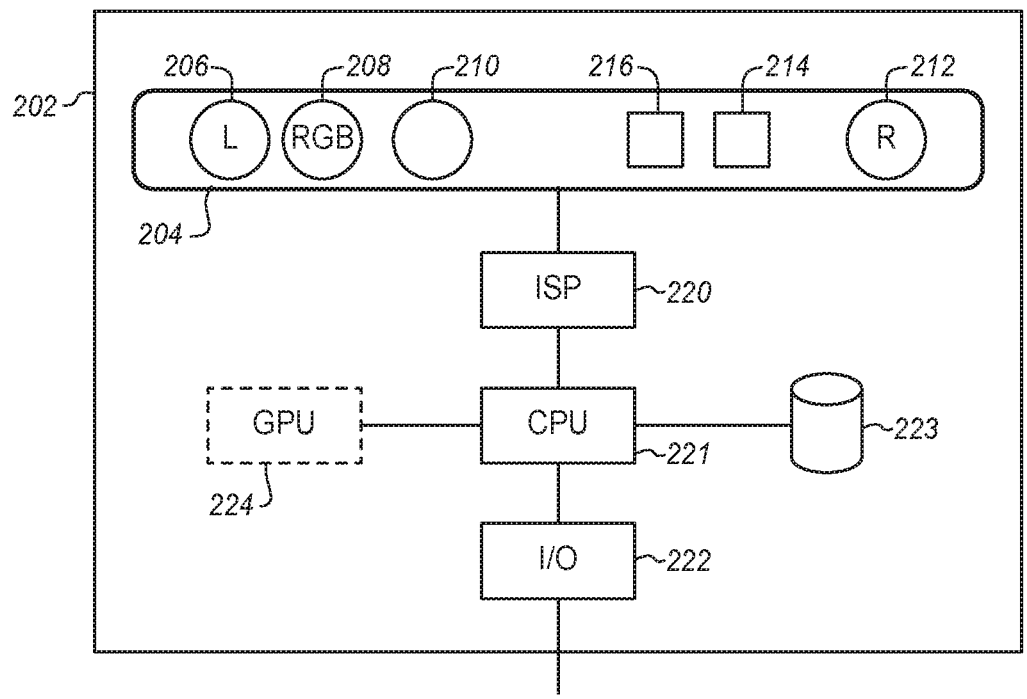
FIG. 1 is a diagram of a device with a camera module according to an embodiment.

FIG. 1 is a diagram of a device 202 that includes a camera module 204. This may be the back of tablet or notebook, or the front of any of a variety of other devices such as those described above. The camera may alternatively be a standalone webcam, surveillance camera, or any other type of camera system. The device 202 includes a camera module 204 coupled to an image signal processor 220, coupled to a central processing unit (CPU) or microcontroller 221, coupled to an input/output interface 222. The CPU is also coupled to mass storage 223 and may optionally be coupled to a graphics processing unit (GPU) 224. The device may then present images, video, depth maps, and other data through the I/O interface as well as receive commands, etc. The device may also have user interface devices, such as input, display, audio, etc. The device may also include any of a variety of different power supplies, sensor drivers, image buffers, and other signal processors.

The camera module has multiple image sensors to capture depth images. The particular image sensors may vary depending on the implementation. In the illustrated example, the imaging system 204 includes a left side IR image sensor 206, a visible light color (RBG (Red, Green Blue) or Bayer pattern) image sensor 208, an IR projector 210, and a second right side IR image sensor 212. More or fewer image sensors of various types may be used, depending on the intended use. In this example, the IR image sensors 206, 212 may be used for IR photography and also as a stereo camera combination to provide depth information for the visible light images from the RGB sensor 208.

The IR projector 210 may be used in combination with each of the two sensors of the stereo camera combination to implement two additional depth camera combinations, based on a structured light principle. The first camera combination is the two IR imagers. The two additional combinations are the left IR sensor with the projector and the right IR sensor with the projector. By combining the information from the additional two sources of triangulation, pointing errors for all three components, the two depth cameras 206, 212 and the projector 210, can be derived in a manner that is independent from the scene contents.

The left and right sensors capture an image of the same scene, with or without use of the projector and this is stored in a buffer 214 for processing. The depth imaging system may have additional image sensors or other types of depth sensors may be used instead of IR image sensors including RGB sensors. The projector may be an IR LED or laser to illuminate the IR field for detection by a depth sensor. Alternatively, it may an LED (Light Emitting Diode) lamp to illuminate the RGB field for each sensor or the projector may have multiple illumination modes determined by a controller. There may be additional lamps to support the RGB sensor (not shown).

An ASIC (Application Specific Integrated Circuit) or signal processor 216 in the image module calculates a depth map from these two images. The ASIC may be a part of the image module or it may be a separate or connected image signal processor 220 or it may be a general purpose 221 or graphics 224 processor. Left 206 and right 212 image sensors may also stream images for video or for evaluation. These images are processed by the image module ASIC 216 or an image signal processor 220 to determine a depth map. To improve the accuracy of the depth map, the errors between the image sensors and the projector may be calibrated. Correction factors may then be stored for use by the imaging ASIC or another component for use in correcting any depth map determinations.

In a conventional factory calibration, a test chart is configured specifically for a calibration test. The distance from an image sensor to the chart and the sensor's orientation relative to one of the IR sensors can be derived using only a single sensor. This is because the features of the test chart are known, that is the dimensions of the features and their spacing. The distance to the test chart may also be measured and known in some cases. As an example, the size of a square on the test chart is proportional to the distance to the target. The warpage or distortion of the square is proportional to the angle between the image sensor and the target. Once the relative position of the test chart is known, errors in the depth measured using a stereo pair can be identified and camera parameters including pointing direction can be compensated to correct for the resulting errors in the depth output. Depth in this description refers to the distance from an image sensor to the test chart or other feature that is being used for calibration. Such a chart produces accurate results provided that all of the known parameters are known with precision.

Figure 2:
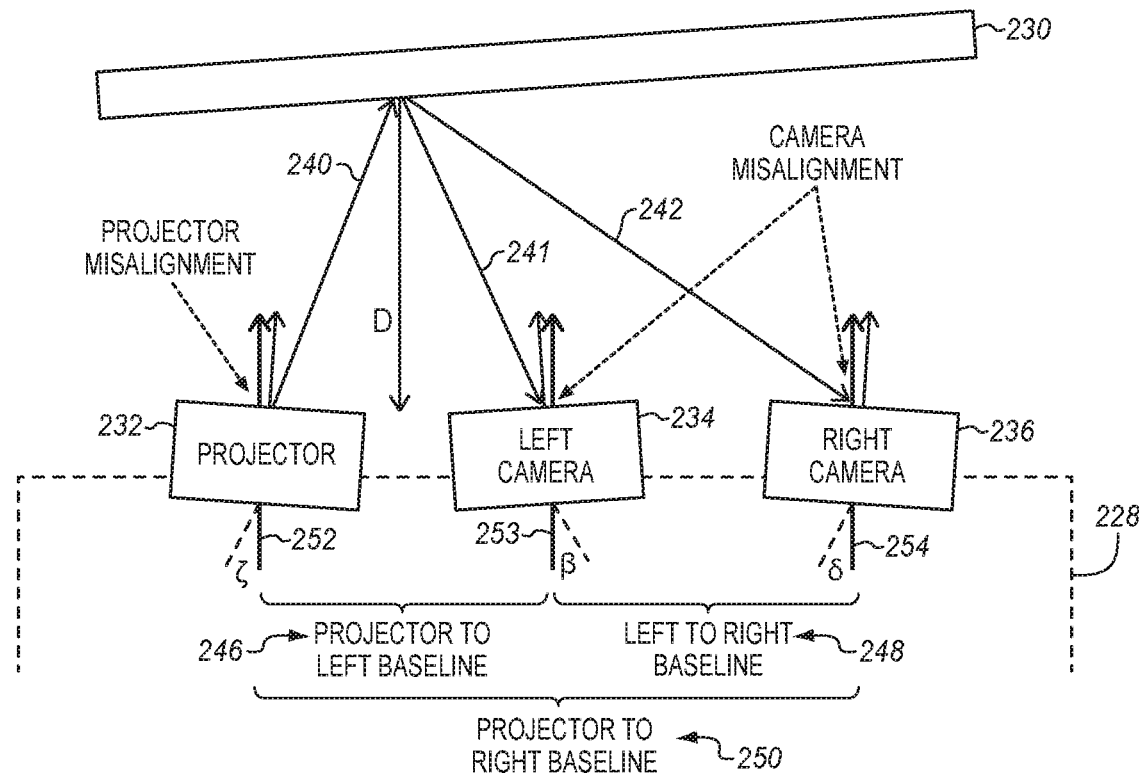
FIG. 2 is a diagram of a geometry of a single feature point in a stereo camera system according to an embodiment.

FIG. 2 is a diagram of a two-camera system with a projector suitable for use with embodiments herein. A camera system 228 is placed before a scene or surface 230. The system has a projector 232. The projector emits a beam of light 240 to project a structured pattern on the surface 230. The camera system also has, in this case, two cameras, a left camera 234 and a right camera 236. There are at least three baselines for the camera system that may be used to determine disparity and other performance parameters. There is a baseline 246 between the projector and the left camera. There is a baseline 250 between the projector and the right camera and there is a baseline 248 between the left and the right camera.

These cameras may take any of a variety of different forms. Typically, there will be an image sensor and optical system to direct light onto the imaging system. The image sensors will be coupled to controllers and processors to operate the sensor and collect image data. If a test chart is used at a known distance, then this chart will be on the surface 230 in this example.

In such a two-camera system, it is possible to self-calibrate some errors without any knowledge of the size or distance of a feature on the scene. Once a common feature has been identified in both of the two cameras, its disparity (or pixel displacement) between the two cameras can be measured. The disparity is related to the difference in the pixel placement of the one feature in the image sensor of one camera compared to the same feature's pixel placement in the image sensor of the other camera. The disparity is primarily due to the distance between the cameras and the distance from each camera to the feature. A disparity that is not along the stereo axis is not due to depth and this information can be used to determine rotation errors, magnification errors and pointing errors that are orthogonal to the stereo axis. The stereo axis is the axis that goes through the center of each image sensor of the camera pair.

Without more information, however, the two-camera system cannot determine errors along the epipolar axis. These are indistinguishable from disparity caused by the depth. Without knowing the size or depth of the feature, the depth cannot be isolated from the observed disparity. In the example of FIG. 2, projector, left camera, and right camera are all shown as having a misalignment with respect to a plane through each unit. The projector has a misalignment of $\alpha$ from a direct normal 252 from the camera system. The left camera has a misalignment of $\beta$ from a normal 253 and the right camera has a misalignment of $\gamma$ from a normal 254. The normals are all parallel to each other. These misalignment angles may all be viewed as errors with respect to an epipolar axis.

The shortcoming of calibrating a two-camera system with respect to epipolar axis errors can be overcome by adding a third image sensor to the system. The third image sensor provides two additional non-parallel baselines that can be used to derive the pointing errors among all three sensors. On the other hand, a third camera increases the cost and size of the system and therefore may not be suitable for some applications.

As described herein, by leveraging an IR projector 252 as a source for structured light, the camera system 228 can self-calibrate without adding another image sensor. If the IR projector is otherwise required for other purposes, such as autofocus, near object scanning, etc., then the cost or size of the camera system is not increased and the system can be calibrated in the field and without requiring specialized targets and precise knowledge of a target. In the described examples, the projector and the image sensors are in fixed positions relative to each other. In other words, they are all mounted to a common structure, such as a printed circuit board.

By fixed, it is understood that the system is not completely fixed, otherwise no calibration would be used. Instead, the projector and cameras do not move quickly relative to each other after a calibration is performed. This allows the calibration to be used to correct some number of frames before the next calibration is performed. In a typical example, the projector and cameras are mounted to a single substrate that is subject to impact, warping, and other effects so that changes are small over small intervals of time but accumulate over longer intervals of time. In other cases, the projector may be movable within some range relative to the cameras and a calibration is performed after each movement.

While the principles described may be extended to derive any errors in the alignment of the three cameras, this description will focus on determining the pointing errors along the epipolar axis that cannot be derived using traditional methods. These errors are represented by the error angles, $\alpha$, $\beta$, $\gamma$.

Using the structured light projector 232, a structured beam 240 from the projector onto the surface 230 may be used to create a feature 231 on the surface. The feature of the structured light is reflected 241 to the left camera 234 and reflected 242 to the right camera 236. Due to the three baselines 246, 248, 250 between the three elements 232, 234, 236 of the camera system 228, there are additional depth calculations that provide a total of three sources of depth (or disparity) information. For purposes of the calibration, it is assumed that the baselines are fixed. If the baselines change, then another calibration may be performed. The additional component, the projector, also introduces an additional source of misalignment in that the structured light calculations depend also on the alignment of the projector. This yields the following set of parameters for equations for an arbitrary point in the scene:
1) Projector-Left Disparity: Function (Distance, Projector Error, Left Error)
2) Projector-Right Disparity: Function (Distance, Projector Error, Right Error)
3) Left-Right Camera Disparity: Function (Distance, Left Error, Right Error)
Unknowns: Distance, Left Error, Right Error, Projector Error
3 equations, 4 Unknowns, hence not solvable In other words, the disparity between the projector and the left camera is a function of the distance to the feature, the projector alignment error $\alpha$, and the left camera alignment error $\beta$. There are other values necessary to solve the disparity but the other values are all known. The disparity between the projector and the right camera and the disparity between the left and the right camera are functions of the related distance and angular errors. These three relationships are functions of four unknown values which are the three angular errors and the distance to the feature. With three equations and four unknowns, the equations cannot be solved.

The above functions 1-3 are provided simply as a name of the result on the left and a list of the unknown values needed to solve for the result on the right. To actually solve for the result on the left requires several other parameters about the geometry of the camera system, but these can be determined in a factory calibration or are already known. There are several different actual equations used to solve for the values on the left and any of these may be used depending on the configuration of the camera system and the system for performing the determinations. Specific equations are not provided here in order not to obscure the description.

Using additional features on the surface 230, more equations may be generated for which the angular errors are the same. Only the distance changes with different features. With a structured light source from the projector, a scene that has many points may be projected onto the surface. The additional points may be used to provide further information. The additional points do not come with a proportional increase in the number of unknowns.

Figure 3:
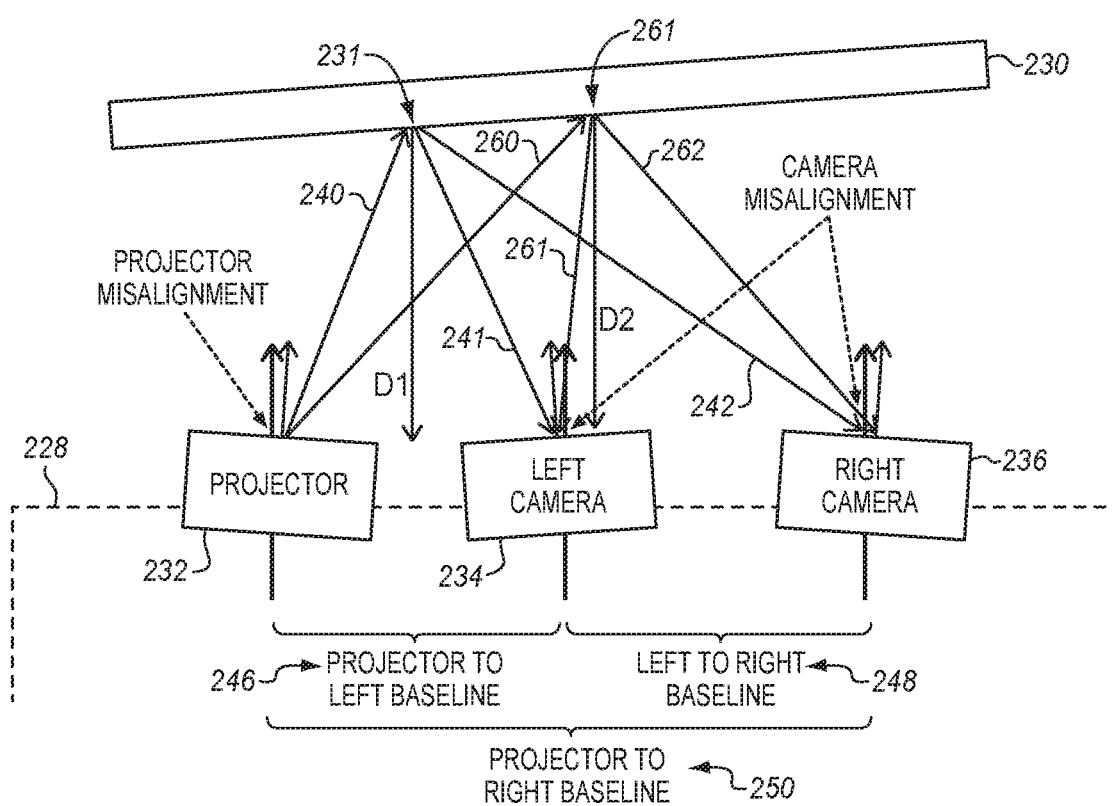
FIG. 3 is a diagram of a geometry of two feature points in a stereo camera system according to an embodiment.

FIG. 3 is a diagram of the camera system 228 directed at the surface 230. Structured light 240, 260 from the projector 232 produces two features 231, 261 on the surface. These are observed by the left camera 234 in reflected beams 241, 261 and the right camera 236 in reflected beams 242, 262. The camera system has the same angular errors $\alpha$, $\beta$, $\gamma$ as when there is a single feature 231 in FIG. 2. Similarly, the baseline distances 246, 248, 250 between the projector and the cameras are the same as in FIG. 2. The projector may be able to produce many more than two features 231, 261. Two features are shown for simplicity. The features may be in the form of lines, a grid, multiple cross hairs or any other desired shape or design. The features identify a single point on the surface 230 whether or not the surface has features that can be discerned by the left and right cameras.

The additional point 261 adds one unknown, the actual distance D2 to the second point. The distance to the first point is indicated as D1. However, there are no additional, unknown alignment errors. There may be a factory calibration of many other system parameters and even non-linear errors such as baseline distances, lens distortion, etc. The configuration of FIG. 3 gives three additional disparity equations for the additional point 261 as follows:
1) Projector-Left Disparity: Function (Distance1, Projector Error, Left Error)
2) Projector-Right Disparity: Function (Distance1, Projector Error, Right Error)
3) Left-Right Camera Disparity: Function (Distance1, Left Error, Right Error)
4) Projector-Left Disparity: Function (Distance2, Projector Error, Left Error)
5) Projector-Right Disparity: Function (Distance2, Projector Error, Right Error)
6) Left-Right Disparity: Function (Distance2, Left Error, Right Error)
Unknowns: Distance1, Distance2, Left Error, Right Error, Projector Error
6 Equations, 5 Unknowns, hence solvable As indicated, by adding another feature at another distance, there are then three more disparity equations that are a function of the new distance. The angular error, however, remains the same. The result is three more equations and one more unknown. The equations can now be solved for all five of the unknowns. More features may be used to add additional disparity equations with only one more unknown for each additional feature.

As described, each additional point identified in the scene that can be traced to the structured light projector adds three disparities and only one new unknown, the distance to the additional point. As a result, the number of characteristics that can be corrected is limited to the number of unique points that can be identified. This allows field calibration to be used to correct the errors that most commonly change during use. Such a field calibration does not require a known target or a known physical configuration. The distance to the point and their positions may be determined together with the angular errors. A similar technique may be applied to other types of errors that change over time with mechanical and thermal stresses.

The projector provides a significant convenience in that it gives a set of points that may be projected anywhere. In addition, the disparity between the cameras can easily be determined for each projected point because the projector has a known baseline distance to each image sensor.

The camera system may have other errors that are better calibrated on a known test bed, such as a system with a known target at a known position as mentioned above. The standardized calibration, such as a factory calibration, is well-suited for parameters that do not change significantly over time, such as image sensor misalignment, lens distortion, and baseline distances. By ensuring that these other parameters are well known, the accuracy of the field calibration is improved.

Figure 4:
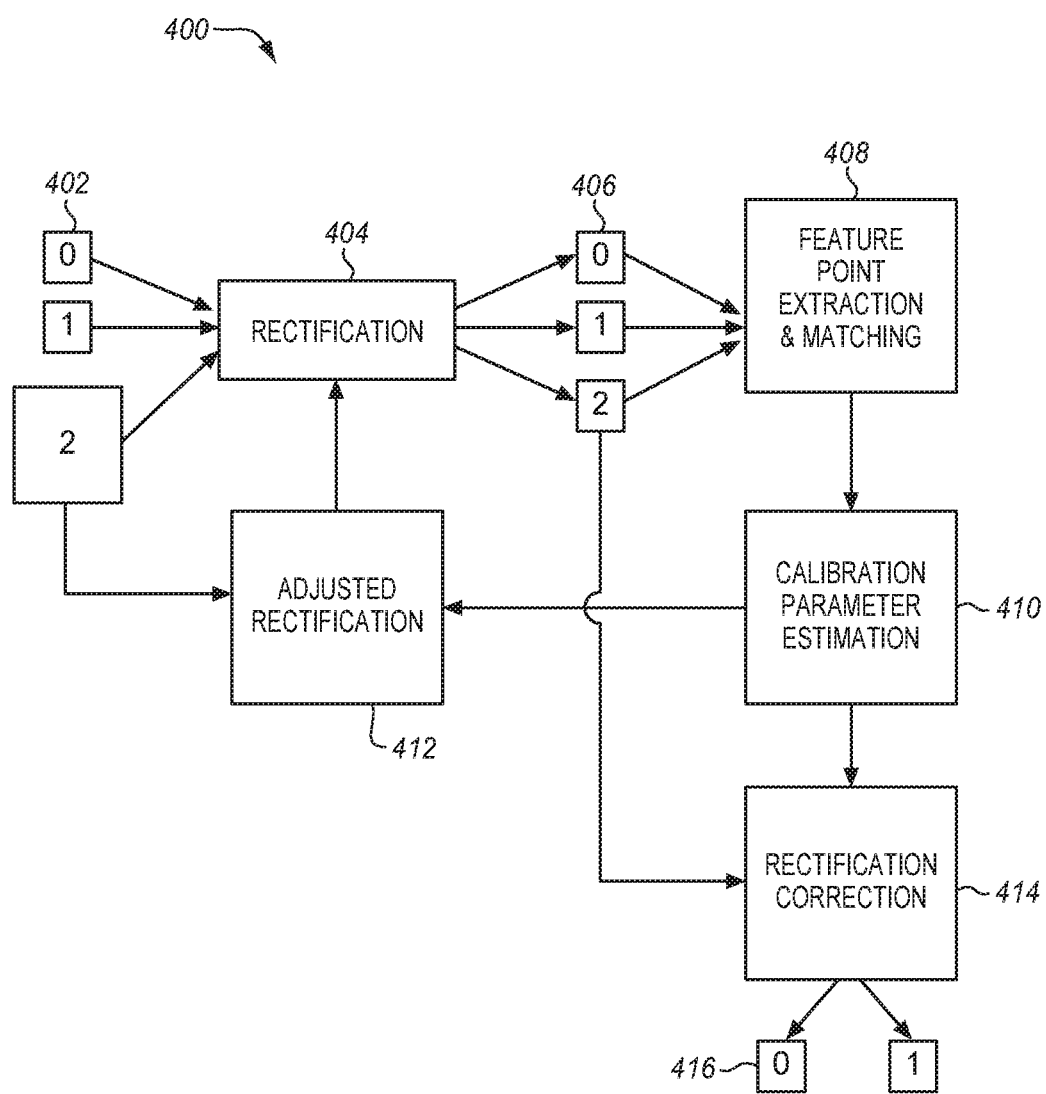
FIG. 4 is a block diagram of a calibration correction process for a multi-camera array with active illumination according to an embodiment.

FIG. 4 is a block diagram of a process 400 of calibration correction for an active stereo camera. The process 400 may include one or more operations, functions or actions as illustrated by one or more of operations 402 to 416.

Process 400 may include obtaining original images 0, 1 from the left and right IR image sensors of the structured light. Image 2 is shown with an enlarged size relative to the other images to represent that image 2 is a structured light pattern. Process 400 then may include rectification logic 404 that produces rectified images 406, and including one from the structured light pattern 2. The original IR images are rectified according to the current calibration of the array and pattern projector. Rectification transforms the IR and projector images into a common plane so that the images may be placed side to side to simplify feature matching.

The process 400 then may include feature extraction and matching logic 408. In this block, features are extracted, and corresponding points on the camera-based images are matched to identical points on the projector-based image. The features also may be properly filtered to eliminate false matches for this operation. The features may be first detected by fast retina features (FREAK), binary robust invariant scalable keypoint (BRISK), scale invariant feature transform (SIFT), speed-up robust feature (SURF), or other such detection programs.

Then for matching the features from image to image, typically, feature are matched by techniques that match descriptors which may include gradient, greyscale, and/or RGB color values of the points for example, and matched by comparing each point on one image to each point on the other image. Tiled matching, however, includes applications that match features in similar tile positions from image to image so that the whole image does not need to be searched for each feature. Specifically, a search area may be restricted to certain blocks of points on one image and near the corresponding location of a point on the other image to be matched, or near a (local) epipolar line from the point to be matched to the other image, or both. Many other conventional methods for matching features are available such as approximate nearest neighbor search, binary search, or brute force one-to-one matching.

The process 400 then may include calibration parameter estimation logic 410 to form the displacement and scale parameters for individual images, and in one form, each image of the structured light projector. The effect of any calibration error will correspond to changes in disparity that can be vectorized into errors aligned and orthogonal to the epipolar axis of the image pairs (0-1, 1-2, 0-2). Errors orthogonal to the epipolar axis may first be corrected among the individual pairs, after which the remaining, parallel errors can be corrected/optimized by adjusting the calibration parameters of the three pairs concurrently.

Once the parameters are determined for an image, the process 400 may then include rectification logic 412. This rectification is adjusted for estimated shift parameters to generate updated parameters for the rectification logic 404 based on the new calibration parameters. Rectification correction logic 414 may be used to generate corrected left and right images 0 and 1. The corrected, rectified images 416 can then be used to perform feature matching with higher accuracy.

Figure 5:
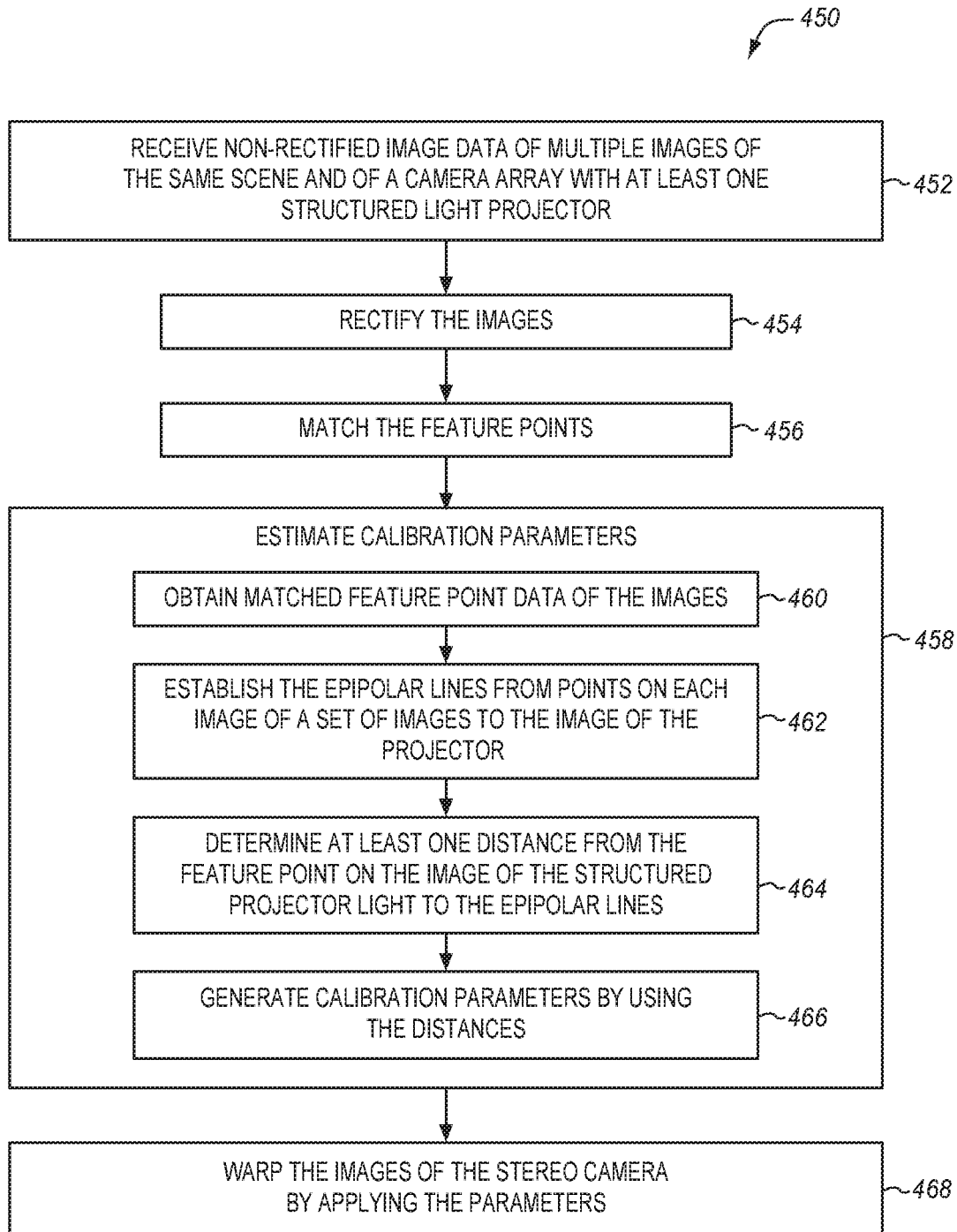
FIG. 5 is a process flow diagram of a lens correction process for a multi-camera array with active illumination according to an embodiment.

FIG. 5 is a process flow diagram of a process 450 of calibration correction for an active stereo camera. In the illustrated implementation, the process and logic 400 of FIG. 4 may include one or more operations, functions or actions as illustrated by one or more of operations 452 to 468.

Process 450 starts at 452 with receiving non-rectified image data of multiple images of the same scene from the IR image sensors of the camera array with at least one structured light projector of the camera array. As mentioned above, while IR image sensors and an IR structured light projector are used, different types of projectors and image sensors may be used instead. Full color image sensors may be used, for example. In some embodiments only the IR portion of a full color signal or some other portion of the signal may be used for calibration. The image data may be from original IR images that have not been rectified yet. The images may have already received pre-processing so that the images are ready for rectification. This may include noise reduction, pixel linearization, shading compensation, resolution reduction, Bayer de-mosaic, vignette elimination, and/or 3A related operations including automatic white balance (AWB), automatic focus (AF), and/or other automatic exposure (AE), operations, among others.

At 452, the received images are rectified. As explained above. This results in all three images being transformed to a common plane to simplify feature point matching from image to image. At 456 the features of the three rectified images are matched to each other. This may include detecting and extracting features, and then finding feature matches across the images.

Using the set of matched features, at 458 calibration parameters are estimated. Specifically, this operation attempts to form parameters that minimize the rectification error. Error equations may be inserted into an over-determined linear system so that the calibration parameter estimates may be determined from the system. An arrangement of images 406 as shown in FIG. 4, 500, as shown in FIG. 6, and corresponding to an arrangement of cameras in a camera array and a structured light projector such as that on device 202 of FIG. 1 may be used to explain this process.

Figure 6:
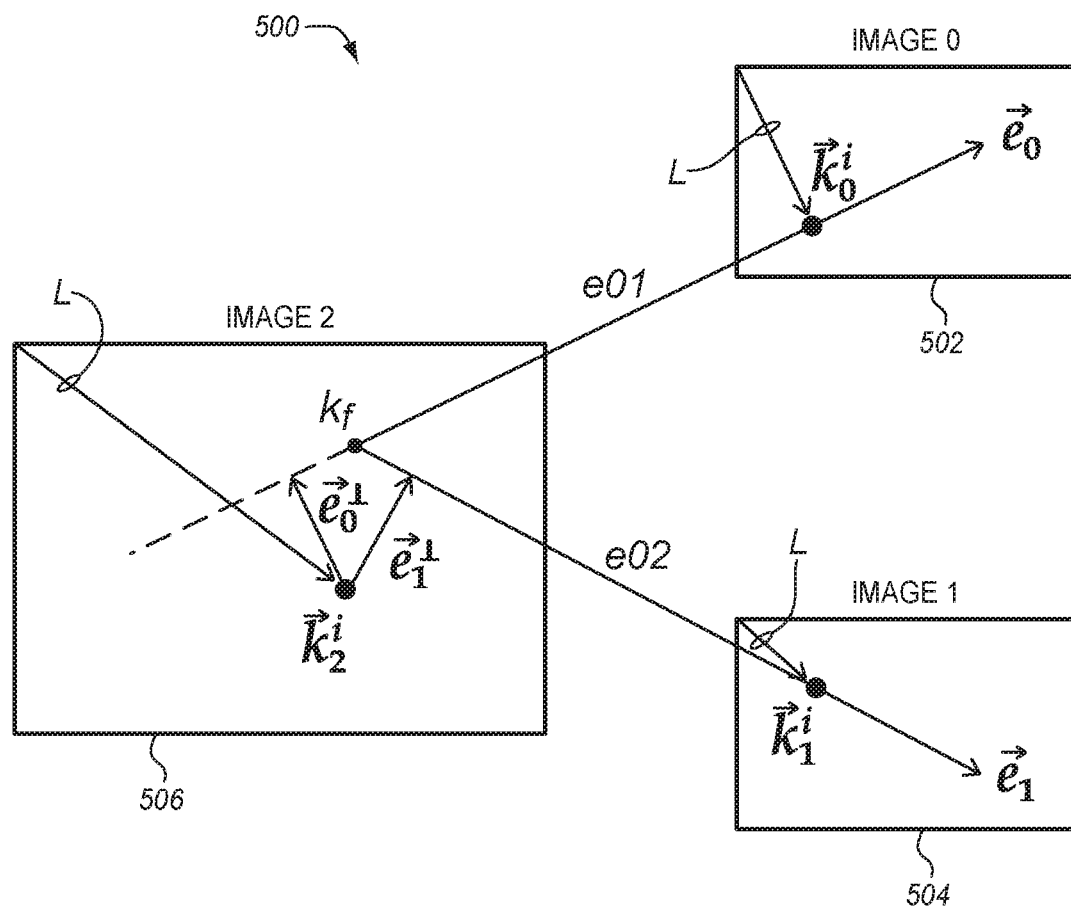
FIG. 6 is a schematic diagram showing the use of multiple rectified images in the calibration correction process according to an embodiment.

FIG. 6 is a diagram of three rectified images 0, 1, and 2 identified as 502, 504, and 506 respectively. The images have a fixed physical relationship to each other which may or may not be the same as that shown in FIG. 6 or the linear array of FIG. 1. Image 2 (506) corresponds to the actual image of the structured light generated by the projector 210 on a surface that is within the view of the two cameras. This image is enlarged in FIG. 5 for explanatory purposes only and does not relate to the actual size of the image, the field of view or the number of pixels. Images 0 and 1 correspond to an image of that structured as captured by each the two IR image sensors 206, 212, respectively.

Three matching feature points are shown $\vec{k}_0^i$, in image 0, $\vec{k}_1^i$, in image 1 and an unintentionally shifted $\vec{k}_2^i$ in image 2. The position in each image of these features may be represented in many different ways. In this example it is represented by coordinates (x,y) corresponding to a horizontal and vertical distance L from the top left corner. This distance is typically expressed in sensor pixels or image pixels, but other representations may also be used. The desired location for $\vec{k}_2^i$ is at $k_f$ in image 2. Each or many of the matched feature point pairs may have their own similar arrangement and similar shift among the images. The unintentional shift is corrected by calibration as described herein.

A first epipolar line from image 0 through the feature point in image 0 to image 2 is indicated as e01 and a second epipolar line from image 1 through the feature point in image 1 to image 2 is indicated as e02. The unit vectors along the epipolar line are indicated as $\vec{e}_0$ in image 0 and $\vec{e}_1$ in image 1. Thus, the misplaced point on the image of the structured light projector may be corrected by determining the amount of the error and then shifting the feature point to the intersection $k_f$ of the multiple epipolar lines. These lines extend from the corresponding points on the IR images to the projector image. Using the feature points and the epipolar lines, the alignment error in image 2 may be determined. This epipolar alignment error may then be used to determine calibration parameters that compensate the error.

The distance between the actual position of the feature and the shifted corrected position of the feature is indicated by distances to the epipolar lines. $\vec{e}_0^\perp$ and $\vec{e}_0^\perp$ are the unit vector orthogonal distances from the misplaced point to the epipolar lines e02 and e01. The orthogonal distance to the epipolar line from image 0 is represented by 0, and similarly by $\vec{e}_1^\perp$ from image 1.

In FIG. 5 parameter estimation 458 includes multiple operations. At 460 matched feature point data is obtained for the images. This may include obtaining the image data for misplaced features on the structured light projector-based image 2, and the corresponding matching features on the fixed-camera-based images 0 and 1. The image data may include the coordinates of the points for each feature, In some embodiments each feature has a descriptor used for matching and position (x,y) in the image, where the position is typically described as a distance L with respect to the top left corner of the image as (0,0). Though in the operation 460, a set of matched features is obtained and in further equations, a feature representation can be taken to mean its location (x,y) in the image.

In some embodiments, the matching features for each image, as shown in FIG. 6 may be defined as a set expressed as shown in Equation 1. The difference in position of these points between each image is the disparity. So for example, the difference in (x,y) position or in L between $\vec{k}_0^i$, and $\vec{k}_1^i$ is the disparity for that feature point between image 0 and image 1. This disparity will differ for different feature points with distance of the actual physical feature from the camera system. The disparity also depends on the misalignment of the camera system but this factor does not change with distance from the camera system. Using the disparity between multiple matched feature points, the misalignment may be determined without knowing the distance from the camera system. As described herein epipolar lines are used when the distance from the camera system is not known.

$$\text{Matching features} = \{\vec{k}_0^i, \vec{k}_1^i, \vec{k}_2^i\} \qquad \text{Eq. 1}$$

The rectification error E may be defined as the orthogonal distance to the epipolar lines from the matched features, and may be determined by using a matched feature set (Eq. 1), as shown by the following rectification error equations. These equations use the features to estimate scale and displacement parameters $\{s, \vec{d}\}$:

$$E_0^i = [(s\vec{k}_2^i + \vec{d} - \vec{k}_0^i)\cdot \vec{e}_0^\perp]^2 \qquad \text{Eq. 2}$$

$$E_1^i = [(s\vec{k}_2^i + \vec{d} - s\vec{k}_1^i)\cdot \vec{e}_1^\perp]^2 \qquad \text{Eq. 3}$$

where $E_0^i$ is the rectification error between the feature points $\vec{k}_0^i$ and $\vec{k}_2^i$, and $E_1^i$ is the rectification error between feature points $\vec{k}_1^i$ and $\vec{k}_0^i$. $\vec{e}_0^\perp$ and $\vec{e}_1^\perp$ are the unit vector orthogonal distances from the misplaced point to the epipolar lines e02 and e01. As shown in FIG. 6, the unit vectors along the epipolar line are indicated as $\vec{e}_0$ and $\vec{e}_1$. The error equations (2) and (3) are least square equations. Alternatively, weighted error or other types of equations may be used.

The minimization of the error may be stated as shown in Equation 4:

$$\{s, \vec{d}\} = \operatorname{argmin}_{\{s, \vec{d}\}} \Sigma_i (E_0^i + E_1^i) \qquad \text{Eq. 4}$$

The scale and displacement parameters $\{s, \vec{d}\}$ of the minimization equation may be solved in an over-determined linear system as explained above with respect to FIG. 3. In one example the solution may take the form of a matrix multiplication as in the following equation:

$$\begin{pmatrix} \vdots & \vdots & \vdots \\ \vec{k}_2^i \cdot \vec{e}_0^\perp & e_{0x}^\perp & e_{0y}^\perp \\ \vec{k}_2^i \cdot \vec{e}_1^\perp & e_{1x}^\perp & e_{1y}^\perp \\ \vdots & \vdots & \vdots \end{pmatrix} \begin{pmatrix} s \\ d_x \\ d_y \end{pmatrix} = \begin{pmatrix} \vdots \\ \vec{k}_0^i \cdot \vec{e}_0^\perp \\ \vec{k}_1^i \cdot \vec{e}_1^\perp \\ \vdots \end{pmatrix} \qquad \text{Eq. 5}$$

where $e_{0x}^{195}$ and $e_{0y}^\perp$ are the x and y components of the orthogonal distance $\vec{e}_0^\perp$ to the epipolar line from image 0, and similarly for $\vec{e}_1^\perp$ from image 1. Each row in the matrix in equation 5 is provided for each epipolar line from a corresponding point on an IR sensor-based image (here images 0 and 1). Thus, two or more rows may be associated with a single misplaced point on the projector-based image 2 and that has matching corresponding points from the other images.

The next operation of estimating calibration parameters 458 of FIG. 5 is establishing the epipolar lines from points on each image of the set of images to the image of the structured light projector at 462. The epipolar line in this example is from a corresponding feature point $\vec{k}_1^i$ or $\vec{k}_0^i$ on respective image 502, 504 of the IR image sensor to a correct matching point on the projector image. The epipolar line extends parallel to the true epipolar line that is the centerto-center of images (or image sensors), and the matching point must fall on this line. Thus, the misplaced point on the image of the structured light projector may be corrected by shifting it to the intersection $k_f$ of the multiple epipolar lines from the corresponding points feature points $\vec{k}_1^i$ and $\vec{k}_0^i$ on the IR images 502, 504 and extending the line to the projector image 506.

Next, at 464 at least one distance is determined from the feature point $\vec{k}_2^i$ on the image of the structured light projector to the epipolar lines, and particularly, to form orthogonal epipolar vectors $\vec{e}_0^\perp$ and $\vec{e}_1^\perp$ from the misplaced point to the epipolar lines. These distances then may be used to determine the parameters by using the distances to populate an equation, such as Equation 5. The distances may be taken as a 2D correction from the misplaced point $\vec{k}_2^i$ to the corrected point $k_f$ as shown, for example in the image arrangement 500 of FIG. 5.

Once all of the feature point data and orthogonal epipolar line distances are obtained, shift parameters are generated at 466 by using the orthogonal distances. In some embodiments, the scale s parameter and displacement dx and dy parameters are determined. By one form, this includes solving a populated over-determined linear system by matrix multiplication to estimate the calibration parameters. The result may be rendered as a single set of final parameters that minimize the rectification errors $E_0^i$ and $E_1^i$, and will be applied to all of the points in the structured light projector image 506 for correction of the image. This completes the calibration parameter estimation 458.

Once the calibration parameters are estimated, the images of the stereo IR image sensor may be warped by applying the parameters at 468. Particularly, the rectified images from cameras 0-2 are adjusted by warping them according to the new calibration parameters. By one form, each of the points are adjusted by factoring in both scale s and displacement dx and dy values, and by using a 2×3 affine transform warping matrix as follows:

$$\begin{bmatrix} s & 0 & dx \\ 0 & s & dy \end{bmatrix} \times \begin{bmatrix} k_{2_x}^i \\ k_{2_y}^i \end{bmatrix} = \begin{bmatrix} k_{f_x} \\ k_{f_y} \end{bmatrix} \quad \text{Eq. 6}$$

which provides final corrected point ($k_{f_x}$, $k_{f_y}$) on the IR sensor images 0 and 1. This same process may be used on multiple features to provide sufficient parameters to solve the correction factor without knowledge of actual real distances to the real projected light features or of the actual dimensions of the projected light features.

Figure 7:
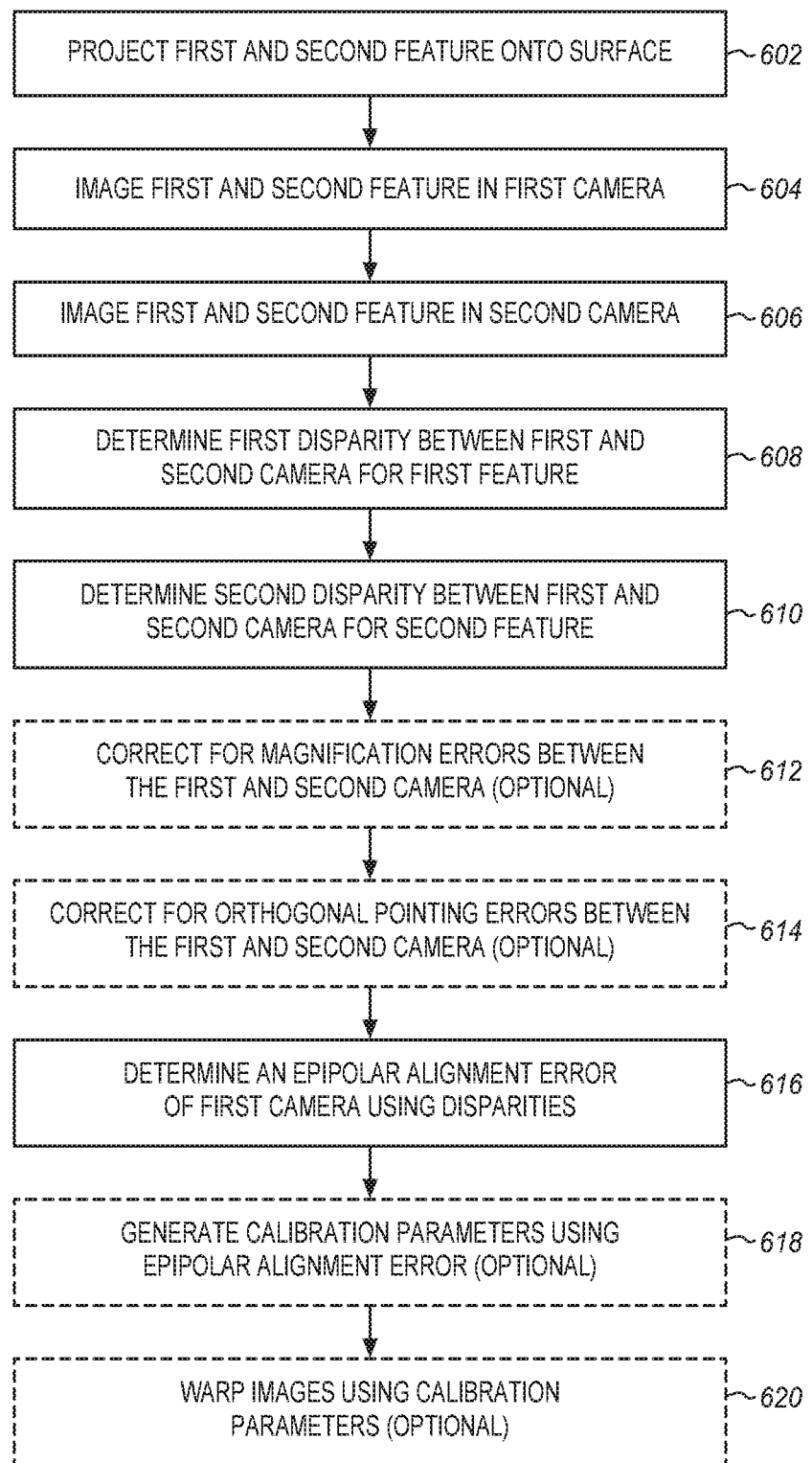
FIG. 7 is process flow diagram of determining an alignment error according to an embodiment.

FIG. 7 is a simplified process flow diagram of determining an alignment error. The process starts at 602 with projecting at least a first and a second feature onto a real physical surface. This is done using a projector of a camera system in which the distance from the projector to first and second cameras is known. While first and second features are discussed herein, there may be many more features. The system may be used with features that are at different distances from the camera system or with features that are the same distance from the camera system.

At 604 the first and second features are imaged in the first camera of the system. At 606 the first and second features are imaged in the second camera. This imaging is typically simultaneous or almost simultaneous to ensure that the cameras do not move between the imaging in the first and the second camera.

At 608 a first disparity is determined between the first and the second camera to the first feature. Similarly at 610 a second disparity is determined between the first and second camera to the second feature. The disparities are determined between the images captured by the two respective cameras.

At 612 an epipolar alignment error of the first camera is determined using disparities. The first camera in this respect may be either of the two cameras and the alignment error relates to a relative value between the two cameras. Images from either one of the cameras may be corrected for alignment with the other camera.

In some cases, the images are corrected by optionally generating calibration parameters based on the epipolar alignment errors at 618. These parameters may then be used optionally to warp images from one or both of the cameras at 620.

As shown, before the epipolar alignment error is determined, a variety of different corrections may optionally be applied to the image data from the cameras. One such correction is to correct for magnification errors between the two cameras at 612. Another such correction is to correct for pointing errors of the cameras that are orthogonal to the stereo axis between the two cameras. These types of errors typically come from the optics system, but there may be other errors that are also corrected.

The correction and calibration operations are described herein as being performed by the camera system locally within the camera system in real time. After a first image or set of images is received, the system is calibrated and the calibration is applied to the subsequent images. The camera systems of FIGS. 1 and 9 have sufficient processing resources to perform these operations. The camera system of FIG. 8 may be coupled to or form a part of the camera system of FIG. 9. Alternatively, the correction and calibration operations such as finding features and disparities and alignment errors may also be performed in post processing. The images may be retrieved from memory and then corrected at some later time. This correction may be done locally by the camera system, by a connected computer, or by remote processing resources, such as a connected server or cloud service. The cameras of FIG. 1 have I/O interfaces that allow images to be transferred to another device. The techniques described herein may be applied to old images captured without being corrected or to images from camera systems that do not or are not able to perform the corrections. Since all the needed information is stored in the three images, projector, first sensor, second sensor, the corrections need not be done at the time of image capture.

Figure 8:
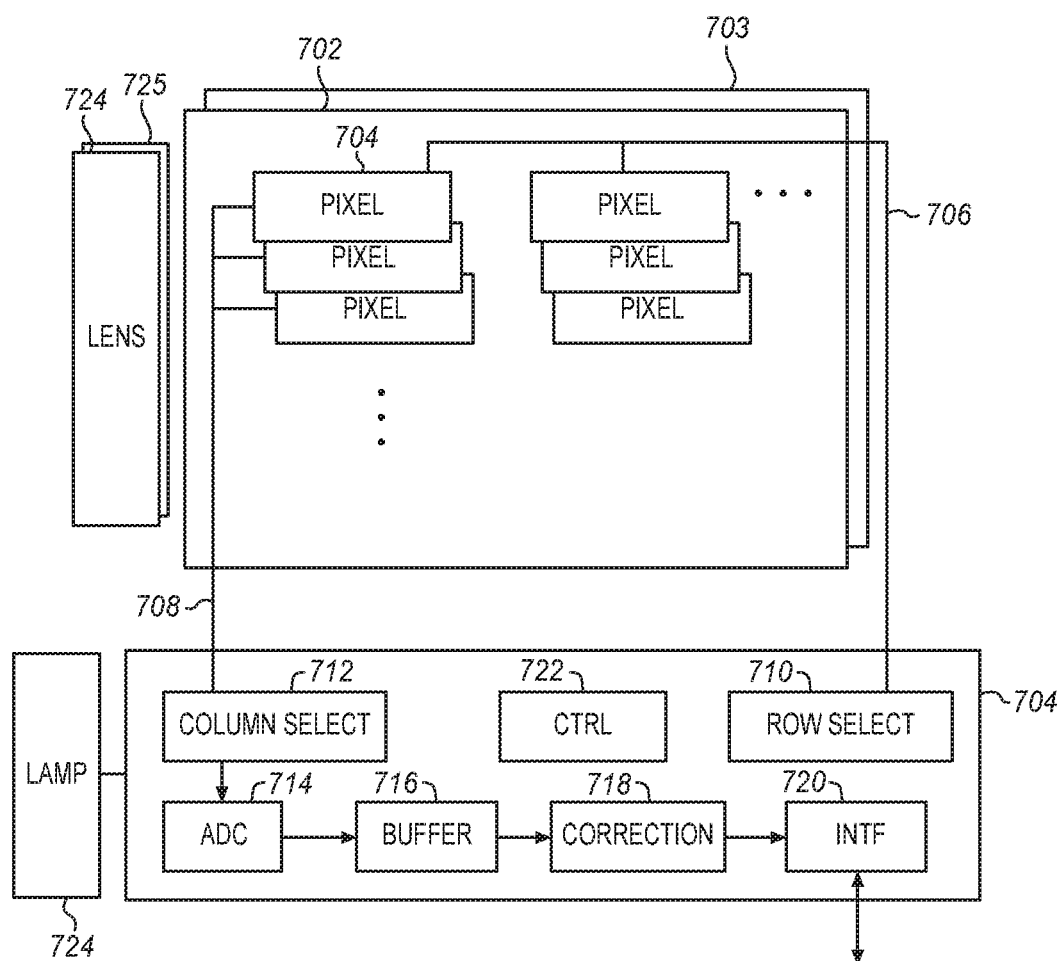
FIG. 8 is a block diagram of an image sensor with multiple photodetectors and depth sensing according to an embodiment.

FIG. 8 is a block diagram of an image sensor or camera system 700 that may include pixel circuits for determining disparity between sensors as described herein. The camera 700 includes multiple image sensors 702, 703, each with pixels typically arranged in rows and columns. There is a lens 724, 725 to image light onto the respective image sensor. This may be a global lens or micro-lenses or both with appropriate filters, depending on the implementation. Each pixel is coupled to a row line 706 and a column line 708. These are applied to one or more image processors or controllers 704.

The image processor has a row selector 710 and a column selector 712. The voltage on the column line is fed to an ADC (Analog to Digital Converter) 714 which may include sample and hold circuits and other types of buffers. Alternatively, multiple ADC's may be connected to column lines in any ratio optimizing ADC speed and die area. The ADC values are fed to a buffer 716, which holds the values for each exposure to apply to a correction processor 718. This processor may compensate for any artifacts or design constraints of the image sensor or any other aspect of the system. The complete image is then compiled and rendered and may be sent to an interface 720 for transfer to external components. There may be an image processor 704 for each image sensor 702, 703 or a single image processor may operate multiple image sensors The image processor 704 may be regulated by a controller 722 and contain many other sensors and components. It may perform many more operations than those mentioned or another processor may be coupled to the camera or to multiple cameras for additional processing. The controller may also be coupled to a lens system 724, 725 for each image sensor. The lens system serves to focus a scene onto the sensor and the controller may adjust focus distance, focal length, aperture and any other settings of the lens system, depending on the particular implementation. For depth imaging using disparity, additional lenses and sensors may be used. These may of different types, such as RGB and infrared, different resolutions and have different types of lenses with different focal lengths. This may be coupled to the same image processor 704 or to other image processors depending on the particular implementation.

The controller may also be coupled to a lamp or projector 724. This may be an LED in the visible or infrared range. There may also be a Xenon flash, LED flash, or another illumination source, depending on the particular application for which the lamp is being used. The controller coordinates the lamp with the exposure times to achieve different exposure levels described above and to project structured light onto surfaces in front of the camera. The lamp may produce a structured, coded, or plain illumination field. There may be multiple lamps to produce different illuminations of different types and in different fields of view.

Figure 9:
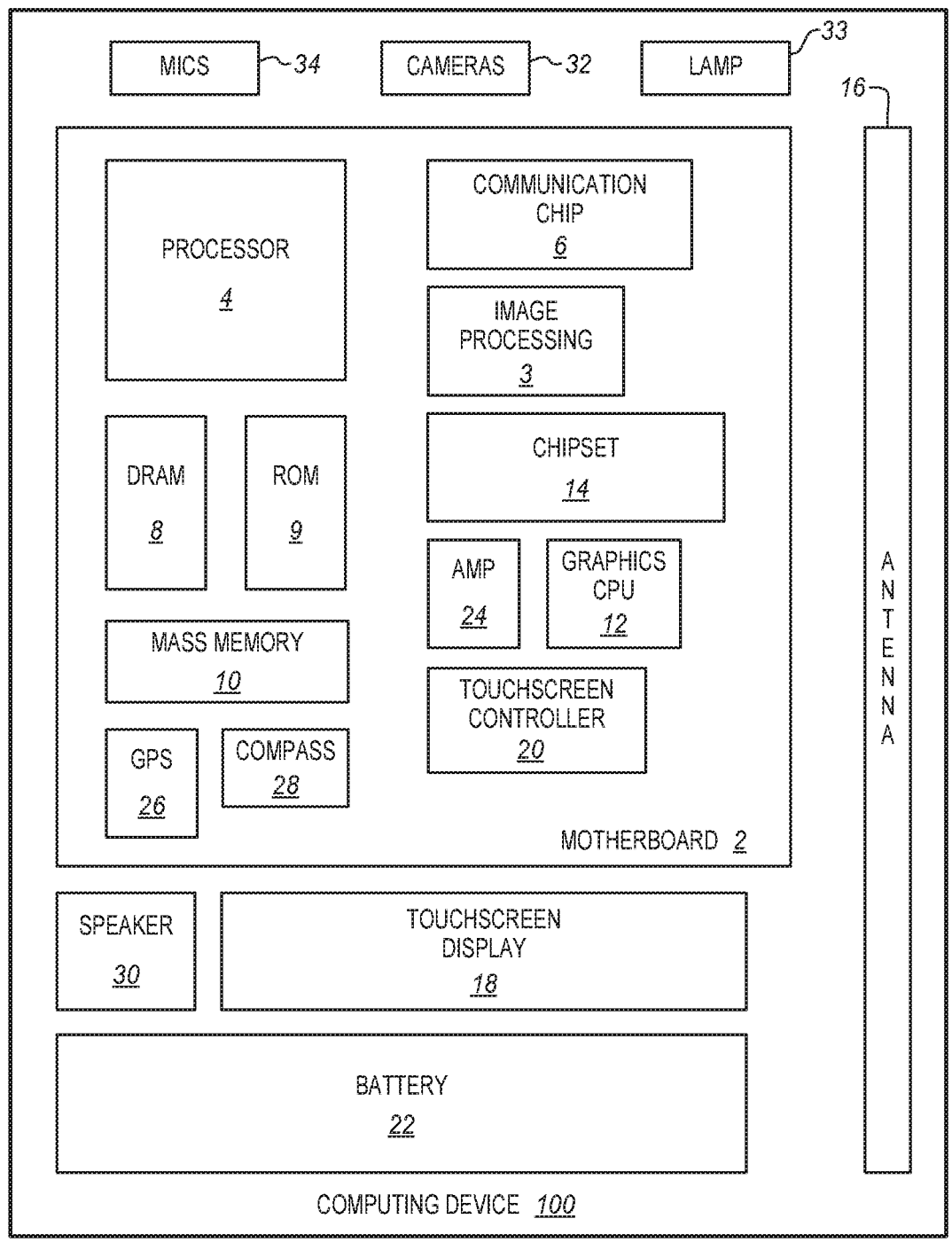
FIG. 9 is a block diagram of a computing device incorporating depth sensing and high dynamic range according to an embodiment.

FIG. 9 is a block diagram of a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a lamp 33, a microphone array 34, and a mass storage device (such as a hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain multiple image sensors to determine depth as described herein. The image sensors may use the resources of an image processing chip 3 to read values and also to perform calibration, exposure control, depth map determination, format conversion, coding and decoding, noise reduction and 3D mapping, etc. The processor 4 is coupled to the image processing chip to drive the processes, set parameters, etc.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, a digital video recorder, wearables or drones. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements.

Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes imaging the first and the second feature in a first camera of the camera system wherein the distance from the first camera to the projector is known, imaging the first and the second feature in a second camera of the camera system, wherein the distance from the second camera to the projector is known, determining a first disparity between the first camera and the second camera to the first feature, determining a second disparity between the first camera and the second camera to the second feature, and determining an epipolar alignment error of the first camera using the first and the second disparities.

In further embodiments the distance from the camera system to the first feature and the distance from the camera system to the second feature is not known.

In further embodiments the distance from the camera system to the first feature is different from the distance from the camera system to the second feature In further embodiments the epipolar alignment error comprises a pointing error.

Further embodiments include determining a third disparity between the projector and the first camera, determining a fourth disparity between the projector and the second camera, and determining an epipolar alignment error of the second camera using the first, second, third, and fourth disparities.

In further embodiments the camera system has a planar base and the projector, first camera, and second camera are all mounted to the base.

In further embodiments the projector projects a patterned light onto the surface, wherein the pattern defines the first and the second features.

Further embodiments include correcting for magnification errors and pointing errors that are orthogonal to the stereo axis before determining an epipolar alignment error.

Further embodiments include generating calibration parameters using the epipolar alignment error, and warping images of the first and the second camera using the calibration parameters.

In further embodiments determining an epipolar alignment error comprises for the first feature, extending a first epipolar line from the imaged first feature from the first camera, extending a second epipolar line from the imaged first feature from the second camera, determining an orthogonal distance from the projected first feature to the first epipolar line, determining an orthogonal distance from the projected first feature to the second epipolar line, and determining scale and displacement parameters using the orthogonal distances.

In further embodiments determining an epipolar alignment error comprises minimizing a rectification error.

In further embodiments minimizing a rectification error comprises applying a matrix multiplication form to known parameters.

Further embodiments include projecting additional features onto the surface from the projector, imaging the additional features in the first and the second camera, and determining additional disparities each based on an additional feature, wherein determining an epipolar alignment error further comprises determining an epipolar alignment error using the determined additional disparities.

Some embodiments pertain to a machine-readable medium having instructions that when operated on by the machine cause the machine to perform operations that include receiving a first image captured by a first camera including a first and a second feature that are projected from a projector, wherein the distance from the first camera to the projector is known, receiving a second image captured by a second camera including the first and the second feature that are projected from the projector, wherein the distance from the second camera to the projector and the distance from the second camera to the first camera are known, determining a first disparity between the first camera and the second camera to the first feature, determining a second disparity between the first camera and the second camera to the second feature, and determining an epipolar alignment error of the first camera using the first and the second disparities.

Further embodiments include correcting for magnification errors and pointing errors that are orthogonal to a stereo axis between the first camera and the second camera before determining an epipolar alignment error.

In further embodiments determining an epipolar alignment error comprises, for the first feature, extending a first epipolar line from the imaged first feature from the first camera, extending a second epipolar line from the imaged first feature from the second camera, determining an orthogonal distance from the projected first feature to the first epipolar line, determining an orthogonal distance from the projected first feature to the second epipolar line, and determining scale and displacement parameters using the orthogonal distances.

In further embodiments determining an epipolar alignment error comprises minimizing a rectification error by applying a matrix multiplication form to known parameters.

Some embodiments pertain to a camera system that includes a projector of the camera system to project a first and a second feature onto a surface from a projector of a camera system, a first image sensor of the camera system to image the first and the second feature wherein the distance from the first image sensor to the projector is known, a second camera of the camera system to image the first and the second feature, wherein the distance from the second image sensor to the projector is known, and a processor to determine a first disparity between the first image sensor and the second image sensor to the first feature, to determine a second disparity between the first image sensor and the second image sensor to the second feature, and to determine an epipolar alignment error of the first image sensor using the first and the second disparities.

In further embodiments the projector, first camera, and second camera are all mounted to a planar base.

Further embodiments include a mass memory to store images and wherein the images of the first and second feature from the first and the second image sensor are stored in the memory for post processing by the processor.

What is claimed is:

1. A method comprising:
projecting a first feature and a second feature that is separate and distinct from the first feature onto a surface from a projector of a camera system;
imaging the first feature and the second feature with a first camera of the camera system, wherein a first distance from the first camera to the projector is known;
imaging the first feature and the second feature with a second camera of the camera system, wherein a second distance from the second camera to the projector is known;
determining a first disparity between the first camera and the second camera to the first feature;
determining a second disparity between the first camera and the second camera to the second feature; and
determining an epipolar alignment error of the first camera using the first disparity and the second disparity,
wherein the projector, the first camera, and the second camera are in fixed positions relative to each other, and
wherein the first camera is positioned between the projector and the second camera.

2. The method of claim 1, wherein a third distance from the camera system to the first feature is not known, and wherein a fourth distance from the camera system to the second feature is not known.

3. The method of claim 2, wherein the third distance is different from the fourth distance.

4. The method of claim 1, wherein the epipolar alignment error comprises a pointing error.

5. The method of claim 1, further comprising:
determining a third disparity between the projector and the first camera;
determining a fourth disparity between the projector and the second camera; and
determining an epipolar alignment error of the second camera using the first disparity, the second disparity, the third disparity, and the fourth disparity.

6. The method of claim 1, wherein the camera system has a planar base, and wherein the projector, the first camera, and the second camera are all mounted to the planar base.

7. The method of claim 1, wherein the projector is configured to project a patterned light onto the surface, and wherein the patterned light defines the first feature and the second feature.

8. The method of claim 1, further comprising correcting for magnification errors and pointing errors that are orthogonal to a stereo axis before determining the epipolar alignment error.

9. The method of claim 1, further comprising:
generating calibration parameters using the epipolar alignment error; and
warping images of the first camera and the second camera using the calibration parameters.

10. The method of claim 1, wherein determining the epipolar alignment error of the first camera comprises:
extending a first epipolar line from the first feature from the first camera;
extending a second epipolar line from the first feature from the second camera;
determining a first orthogonal distance from the first feature to the first epipolar line;
determining a second orthogonal distance from the first feature to the second epipolar line; and
determining scale and displacement parameters using the first orthogonal distance and the second orthogonal distance.

11. The method of claim 1, wherein determining the epipolar alignment error comprises minimizing a rectification error.

12. The method of claim 11, wherein minimizing the rectification error comprises applying a matrix multiplication form to known parameters.

13. The method of claim 1, further comprising:
projecting additional features onto the surface from the projector, the additional features being separate and distinct from the first feature and the second feature;
imaging the additional features with the first camera and the second camera; and
determining additional disparities, each of the additional disparities based on an additional feature,
wherein determining the epipolar alignment error further comprises determining the epipolar alignment error using the additional disparities that are determined.

14. The method of claim 1, further comprising:
performing near object scanning with the projector.

15. A non-transitory computer-readable medium having instructions that, when operated on by an electronic processor, cause the electronic processor to perform a set of operations comprising:
receiving a first image captured by a first camera including a first feature and a second feature that is separate and distinct from the first feature, wherein the first feature and the second feature are both projected from a projector, and wherein a first distance from the first camera to the projector is known;
receiving a second image captured by a second camera including the first feature and the second feature, wherein a second distance from the second camera to the projector and a third distance from the second camera to the first camera are known;
determining a first disparity between the first camera and the second camera to the first feature;
determining a second disparity between the first camera and the second camera to the second feature; and
determining an epipolar alignment error of the first camera using the first disparity and the second disparity,
wherein the projector, the first camera, and the second camera are in fixed positions relative to each other, and
wherein the first camera is positioned between the projector and the second camera.

16. The non-transitory computer-readable medium of claim 15, wherein the set of operations further includes correcting for magnification errors and pointing errors that are orthogonal to a stereo axis between the first camera and the second camera before determining the epipolar alignment error.

17. The non-transitory computer-readable medium of claim 15, wherein determining the epipolar alignment error of the first camera comprises:
extending a first epipolar line from the first feature from the first camera;
extending a second epipolar line from the first feature from the second camera;
determining a first orthogonal distance from the first feature to the first epipolar line;
determining a second orthogonal distance from the first feature to the second epipolar line; and
determining scale and displacement parameters using the first orthogonal distance and the second orthogonal distance.

18. The non-transitory computer-readable medium of claim 15, wherein determining the epipolar alignment error comprises minimizing a rectification error by applying a matrix multiplication form to known parameters.

19. A camera system comprising:
a projector configured to project a first feature and a second feature that is separate and distinct from the first feature onto a surface;
a first image sensor configured to image the first feature and the second feature, wherein a first distance from the first image sensor to the projector is known;
a second image sensor configured to image the first feature and the second feature, wherein a second distance from the second image sensor to the projector is known; and
an electronic processor configured to
determine a first disparity between the first image sensor and the second image sensor to the first feature,
determine a second disparity between the first image sensor and the second image sensor to the second feature, and
determine an epipolar alignment error of the first image sensor using the first disparity and the second disparity,
wherein the projector, the first image sensor, and the second image sensor are in fixed positions relative to each other, and
wherein the first camera is positioned between the projector and the second camera.

20. The camera system of claim 19, further comprising:
a first camera including the first image sensor;
a second camera including the second image sensor; and
a printed circuit board,
wherein the projector, the first camera, and the second camera are all mounted to the printed circuit board.

21. The camera system of claim 19, further comprising a memory to store images, and
wherein the images of the first feature and the second feature from the first image sensor and the second image sensor are stored in the memory for post processing by the electronic processor.

* * * * *